Aug. 1, 1961 H. G. PRESTON 2,994,862
DIGITAL TO ANALOG CONVERSION
Filed Sept. 29, 1958
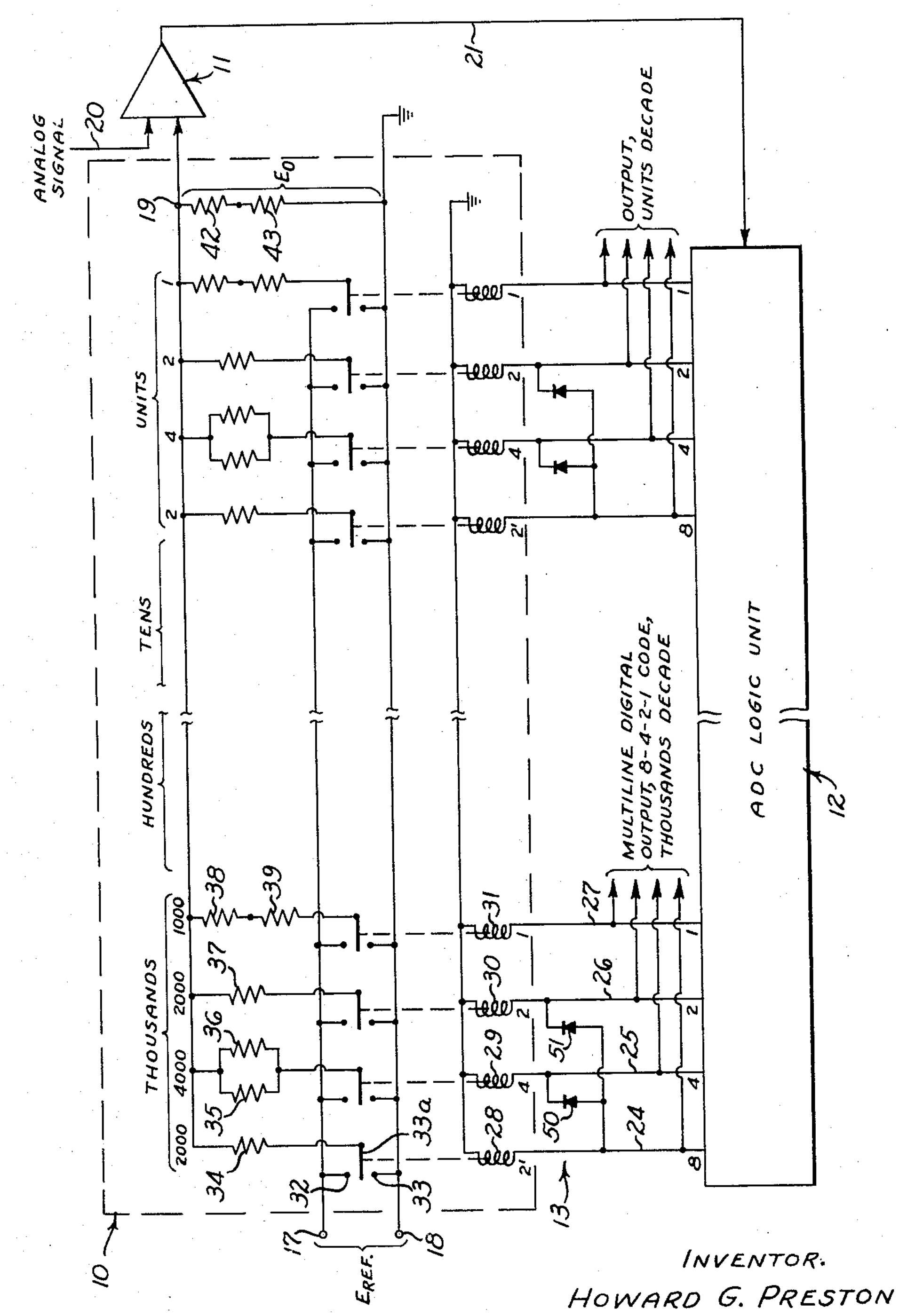
INVENTOR.
HOWARD G. PRESTON
BY HIS ATTORNEYS.
HARRIS, KIECH, FOSTER & HARRIS United States Patent Office 2,994,862

Patented Aug. 1, 1961

2,994,862

DIGITAL TO ANALOG CONVERSION

Howard G. Preston, Whittier, Calif., assignor to Beckman Instruments, Inc., a corporation of California Filed Sept. 29, 1958, Ser. No. 763,863
3 Claims. (Cl. 340—347)

This invention relates to digital-to-analog conversion and, in particular, to circuitry for use in conductance adders for achieving maximum accuracy with a minimum of components. A conductance adder generates an output voltage in response to a digital input, the output voltage being a portion of an input voltage with the proportionality determined by the digital input. Such an adder may be used to modify an analog voltage in response to digital information, may be used as a digital-to-analog converter having a constant input voltage and generating an anlog output voltage, or may be used as the digital-to-analog converter section of a conventional analog-to-digital converter.

In a conductance adder, the output voltage may be selected by digital operation such that the ouput voltage may assume any value of a series of values that form an arithmetic series. A conductance adder having $n$ steps may be used for the generation of output voltages that are any of the voltages $1e$, $2e$, $3e$, . . . $ne$, in which $e$ is a constant voltage increment dependent upon a reference voltage that is supplied to the conductance adder as an input. A conductance adder will have an input terminal, an output terminal and a common terminal, with the input voltage applied across the input terminal and the common terminal, and the output voltage generated between the output terminal and the common terminal. With the input voltage being the only voltage source in the network, the output voltage is equal to the input voltage multiplied by the quotient of the conductance between the input and output terminals and the sum of said conductance and the conductance between the output and the common terminals. As said sum represents all the finite conductances present in the network, the output voltage is proportional to the conductance between the input and output terminals or, stated differently, the output depends upon the sum of the conductances between the output and input terminals. Hence, the output voltage is determined by the magnitude of the input voltage and by a ratio of resistances or conductances.

A conductance adder of the type under consideration here consists of a plurality of precision resistors and a plurality of switches for connecting the resistors in particular arrangements. It has been found that all precision resistors vary somewhat in their resistance values, such as may be caused by aging, ambient temperatures, and other factors. The behavior of resistors that are nominally identical in type and magnitude has been found to be subject to less variation under extraneous circumstances and with age than resistors of different types of construction or different magnitudes. Accordingly, it is an object of the invention to provide a conductance adder that may be constructed with a minimum number of resistors that are different in magnitude. It is a further object of the invention to provide a conductance adder in which the resistors associated with one digit may be of one magnitude only.

It is conventional in conductance adders and other digital equipment to handle the digital information in binary bits on parallel lines as an 8-4-2-1 decimal code. However, such a code requires a wide range of conductance values in a conductane adder. It is an object of the invention to provide a conductance adder using a 2-4-2-1 digital code. Such a code provides a reduction in the maximum conductance range per decade from 8 to 1 to 4 to 1 and, furthermore, permits manufacture of each decade of an adder using six identical resistors.

Since much conventional digital equipment utilizes the 8-4-2-1 code, it is another object of the invention to provide a simple and inexpensive circuit for converting from the 8-4-2-1 code to the 2-4-2-1 code. Another object is to provide such a conversion circuit which requires only a pair of diodes or other rectifiers for interconnection of the two multiline codes.

The present invention is shown here as part of an analog-to-digital converter having a conductance adder operating on a 2-4-2-1 code to provide an output voltage for comparison with an analog signal, with the digital input to the conductance adder being converted from the 8-4-2-1 code which provides a digital indication of the magnitude of the analog signal.

The novel details of the circuitry and its operation, together with other objects, advantages, features and results, will more fully appear in the course of the following description. The drawing shows a preferred embodiment of the present invention incorporated in an analog-to-digital converter, which embodiment is given by way of illustration or example.

The circuit of the drawing includes a conductance adder 10, a comparator amplifier 11, an analog-to-digital converter logic unit 12, and a code conversion network 13.

The adder 10, the amplifier 11 and the logic unit 12 are operated as an analog-to-digital converter in the conventional manner, the analog input signal being compared successively with a series of analog signals generated by the conductance adder, the most significant digit first. In the four digit unit of the drawing, the conductance adder generates an analog voltage of 9000 by actuation of appropriate switches. If this is greater than the input analog signal, an 8000 is generated and compared. Successively smaller thousands signals are generated and compared until one is lower than the input analog signal. The switches associated with this particular value are left in their positions and the hundreds decade is tried in the same manner. Following this, the tens and units decades are similarly operated until the difference between the input analog signal and the analog voltage generated by the conductance adder is less than the smallest increment produced by the adder.

An input or reference voltage is connected across input terminal 17 and common terminal 18 and the output voltage of the adder appears across an output terminal 19 and the common terminal 18. The output of the adder is connected as one input to the comparator amplifier 11 and the input analog signal is connected as the other input by line 20. The comparator amplifier 11 provides an output which is a function of the difference between the two inputs thereto with the output being susbtantially zero when the difference between the inputs is less than the smallest increment produced by the adder. The output of the amplifier is connected to the logic unit 12 by line 21 to operate the logic unit in the same manner as the logic unit of a conventional analog-to-digital converter providing an output for actuating the adder to vary the magnitude of the adder output.

The logic unit provides a four line digital output for each decade with the conventional 8–4–2–1 decimal code. The units, tens, hundreds and thousands decades of the circuit of the drawing are identical except for the magnitude of the resistors used, and the thousands decade will be described herein in detail. The output for the thousands decade of the logic unit appears at lines 24, 25, 26 and 27 which are identified as the 8, 4, 2 and 1 line or terminal, respectively. These lines or terminals are connected to corresponding switches 28, 29, 30 and 31 of the thousands decade of the conductance adder 10 for actuation thereof, with the conductance adder terminals identified as the 2', 4, 2 and 1 line or terminal, respectively. Each switch has a fixed contact 32 connected to the input terminal 17, another fixed contact 33 connected to the common terminal 18, and a moving contact 33*a* connected to the output terminal 19 through a resistance. The moving contact 33*a* engages the fixed contact 33 for the no signal condition on the associated line from the logic unit.

The magnitudes of the resistances connected in circuit with each switch of a decade are selected to have a conductance ratio of 2:4:2:1 corresponding respectively to the 2', 4, 2 and 1 lines of the adder. Furthermore, the four conductances are preferably formed by using six resistors 34–39 of equal type and magnitude. A single resistor 34 is associated with the 2' line, a pair of resistors 35, 36 is connected in parallel for the 4 line, another resistor 37 is associated with the 2 line, and a pair of resistors 38, 39 is connected in series for the 1 line. Thus, the desired conductance ratio is achieved while using a minimum of equal value resistors. The hundreds, tens and units decades are similarly arranged, with the conductances associated with the hundreds digits being $\frac{1}{10}$ as large as those associated with the thousands digits. The resistors of the tens decade have conductances $\frac{1}{10}$ those of the hundreds decade, and the resistors of the unit decade have conductances $\frac{1}{10}$ of that of the tens decade. A conductance, preferably comprising serially connected resistors 42 and 43, each equal in value to the resistors of the units decade, is permanently connected across output terminal 19 and common terminal 18 so that the output of the conductance adder 10 will range from .0000 to .9999 times the input or reference voltage connected across the input terminal 17 and the common terminal 18.

When the output generated by the adder differs from the input analog signal by less than the least voltage step provided by the adder, the sequencing action of the logic unit will be stopped and the signals on the output lines of the logic unit will provide an indication in digital form of the magnitude of the input analog signal. In the circuit of the invention, this output is in a 8-4-2-1 code suitable for use in the remainder of the system and is converted to the 2-4-2-1 code by the code conversion network of the invention, one such network being required for each decade.

Referring specifically to the thousands decade, the 8, 4, 2 and 1 terminals of the logic unit are directly connected to the 2', 4, 2 and 1 terminals of the adder by the lines 24, 25, 26 and 27, respectively. The 8 terminal of the logic unit is connected to the 4 and 2 terminals of the adder through unidirectional elements, such as diode rectifiers 50 and 51, respectively. The diodes 50, 51 are connected so that a signal at the 8 terminal of the logic unit and on the line 24 will actuate relays 28, 29 and 30, while a signal at the 4 terminal and on the line 25 will actuate only the relay 29 and a signal at the 2 terminal and on the line 26 will actuate only the relay 30.

Hence, a logic unit signal on the 4, 2 or 1 line is directly connected to the corresponding relay of the adder, while a logic unit signal on the 8 line is connected to three relays, namely the 2', 4 and 2 relays. At the same time the logic unit output is available in a 8-4-2-1 code for use with other conventional components.

Thus it is seen that the digital-to-analog conversion circuitry of the invention provides for a 2-4-2-1 code conductance adder using resistors of equal type and magnitude in each decade for maximum accuracy over long periods of operation and also provides simple conversion from the conventional 8-4-2-1 code.

The 2-4-2-1 code of the invention may be used in a conductance adder for the most significant digit or digits while the 8-4-2-1 code is used for the less significant digits. In such a combination the maximum accuracy is achieved with the most significant digit by use of the present invention, while a less expensive circuit which does not require the code conversion diodes is used in digits where the accuracy requirement is less stringent.

Although an exemplary embodiment of the invention has been disclosed and discussed, it will be understood that other applications of the invention are possible and that the embodiment disclosed may be subjected to various changes, modifications and substitutions without necessarily departing from the spirit of the invention. For example, while the switches of the conductance adder have been shown as relays, any conventional type of switching apparatus may be utilized in the construction of the equipment.

I claim as my invention:

1. In a circuit for producing a digital multiline output in an 8-4-2-1 code representative of the ratio of an output voltage to an input voltage, with the output voltage produced across output and common terminals and the input voltage connected across input and common terminals, the combination of: six resistors of equal value, with two of said resistors connected in parallel to form a first pair, and with another two of said resistors connected in series to form a second pair, and with one end of each pair and of each remaining single resistor connected to said output terminal; four switch means with a switch means selectively connecting the other ends of each pair and single resistor respectively to said input terminal and to said common terminal; a set of digital adder terminals comprising a 2', a 4, a 2 and a 1 corresponding respectively to one of said single resistors, said parallel pair of resistors, the other of said single resistors, and said series pair of resistors, with a digital adder terminal connected to each of said switch means respectively in switch actuating relationship for switching the corresponding resistance; a set of digital logic terminals comprising an 8, a 4, a 2, and a 1; a first conductor connecting said 1 terminals; a second conductor connecting said 2 terminals; a third conductor connecting said 4 terminals; a fourth conductor connecting said 8 adder terminal to said 2' logic terminal; a first unidirectional element connected between said 8 adder terminal and said 4 logic terminal; and a second unidirectional element connected between said 8 adder terminal and said 2 logic terminal, with said elements polarized to permit signal transmission from said 8 adder terminals to said 4 and 2 logic terminals.

2. In a circuit for producing a digital multiline output in an 8-4-2-1 code representative of the ratio of an output voltage to an input voltage, with the output voltage produced across output and common terminals and the input voltage connected across input and common terminals, the combination of: six resistors of equal value, with two of said resistors connected in parallel to form a first pair, and with another two of said resistors connected in series to form a second pair, and with one end of each pair and of each remaining single resistor connected to said output terminal; four switch means with a switch means selectively connecting the other ends of each pair and single resistor respectively to said input terminal and to said common terminal; a set of digital adder terminals comprising a 2', a 4, a 2 and a 1 corresponding respectively to one of said single resistors, said parallel pair of resistors, the other of said single resistors, and said series pair of resistors, with a digital adder terminal connected to each of said switch means respectively in switch actuating relationship for switching the corresponding resistance; a set of digital logic treminals comprising an 8, a 4, a 2, and a 1; a first conductor connecting said 1 terminals; a second conductor connecting said 2 terminals; a third conductor connecting said 4 terminals; a fourth conductor connecting said logic 8 terminal and said adder 2' terminal; and means for coupling a signal at said logic 8 terminal to said adder 4 and 2 terminals.

3. In a conductance adder for producing an output voltage across an output terminal and a common terminal, which output voltage is equal to a particular portion of a reference input voltage connected to an input terminal and the common terminal, which portion is determined by a digital input to the adder, the combination of: four switches, each of said switches having a first fixed contact connected to said input terminal, a second fixed contact connected to said common terminal, and a moving contact for connecting to either of said fixed contacts; six resistors of equal value; means for producing a signal having a weighted value corresponding to the binary digit 2′ comprising one of said resistors connected between the moving contact of one of said switches and said output terminal, means for producing a signal having a weighted value corresponding to the binary digit 4 comprising a pair of said resistors connected in parallel between the moving contact of a second of said switches and said output terminal, means for producing a signal having a weighted value corresponding to the binary digit 2 comprising another one of said resistors connected between the moving contact of a third of said switches and said output terminal, means for producing a signal having a weighted value corresponding to the binary digit 1 comprising another pair of said resistors connected in series between the moving contact of a fourth of said switches and said output terminal; and means for converting from the 8-4-2-1 to the 2′-4-2-1 binary decimal codes for actuating each of said switches in response to a digital input coupled thereto.

References Cited in the file of this patent

UNITED STATES PATENTS

| | | |
|---|---|---|
| 2,754,503 | Forbes | July 10, 1956 |
| 2,865,564 | Kaiser | Dec. 23, 1958 |